J. D. CANALE.
NUT CRACKING MACHINE.
APPLICATION FILED APR. 21, 1915.
1,160,376.
Patented Nov. 16, 1915.
3 SHEETS—SHEET 1.
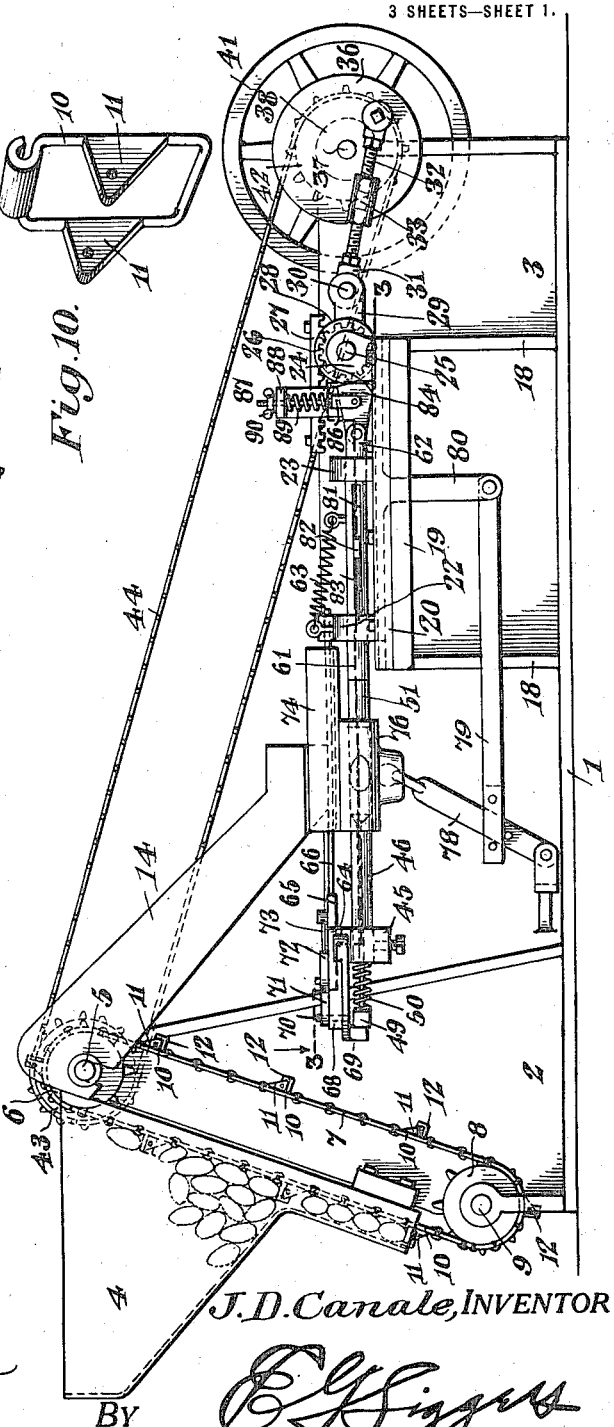
WITNESSES:
J. D. Canale, INVENTOR
BY
Attorney

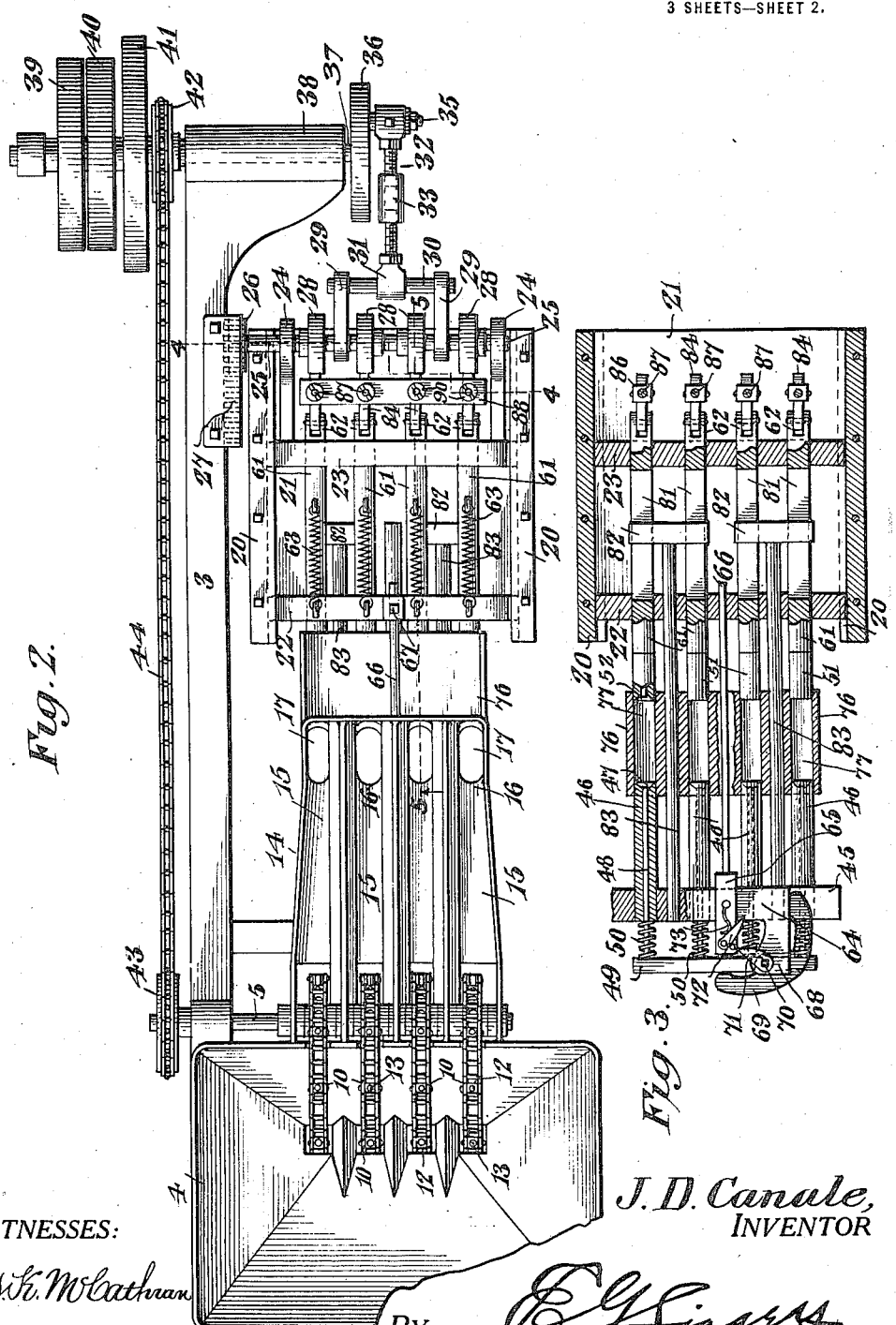

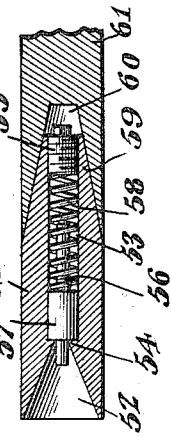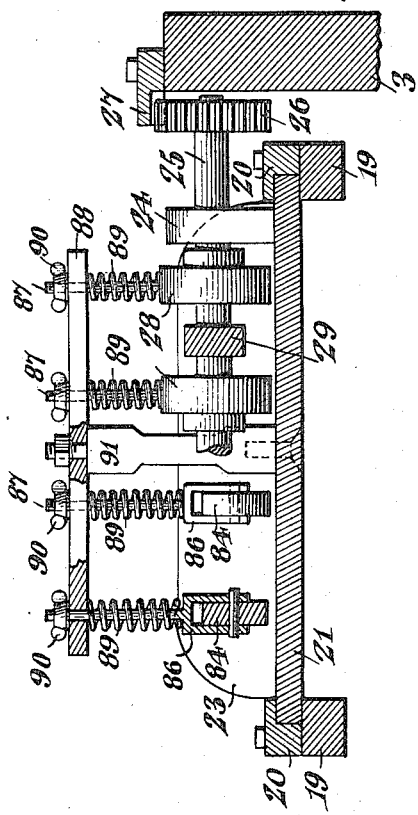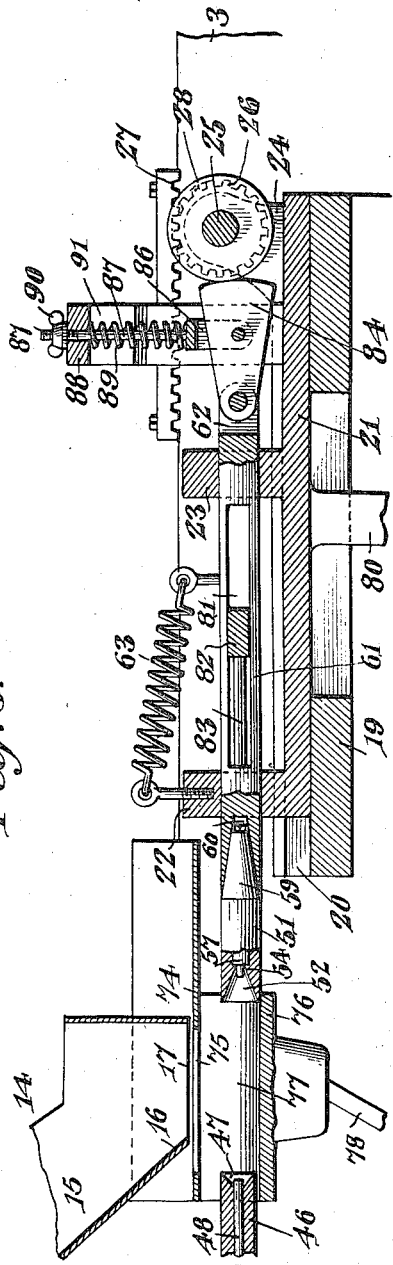

UNITED STATES PATENT OFFICE.

JOHN DOMINICK CANALE, OF MEMPHIS, TENNESSEE.

NUT-CRACKING MACHINE.

1,160,376.  Specification of Letters Patent.  Patented Nov. 16, 1915.

Application filed April 21, 1915. Serial No. 22,899.

*To all whom it may concern:*

Be it known that I, JOHN DOMINICK CANALE, a citizen of the United States, residing at Memphis, in the county of Shelby and State of Tennessee, have invented a new and useful Nut-Cracking Machine, of which the following is a specification.

This invention has reference to nut cracking machines, and its object is to provide means whereby the nuts are delivered one at a time to the cracking devices and the cracking devices are actuated so as to grip the nuts and apply thereto a shell cracking force progressing in effect sufficiently to shatter the shell without injury to the meat.

The present invention has to do with a type of nut cracking machine wherein the nuts are each lodged between two cracking elements, one of which is stationary and may be termed the anvil, and the other of which is movable and may be termed a follower, while the pressure exerted upon the nut to shatter the shell is imparted to the nut after it is properly located and held between the anvil and follower.

The present invention provides in conjunction with such type of machine certain improvements in construction with respect to the operating mechanism, the follower actuating mechanism and other features whereby the operation of the machine is improved and the cracking of the nuts is facilitated.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a side elevation of a machine embodying the features of the present invention. Fig. 2 is a plan view of the structure shown in Fig. 1. Fig. 3 is a section on the line 3—3 of Fig. 1. Fig. 4 is a section on the line 4—4 of Fig. 2. Fig. 5 is a section on the line 5—5 of Fig. 2. Fig. 6 is a longitudinal section through a portion of one of the followers and drawn on a larger scale than the other figures. Fig. 7 is a side elevation of a portion of one of the nut elevators. Fig. 8 is a section on the line 8—8 of Fig. 7. Fig. 9 is a perspective view of one of the nut carriers. Fig. 10 is a perspective view of one of the links designed to support a nut carrier.

Referring to the drawings there is shown an elongated base 1 having uprights 2, 3, erected thereon near opposite ends. The upright 2 carries a hopper 4 and near the upper end of the hopper there is journaled a transverse shaft 5 carrying sprocket wheels 6 meshing with endless sprocket chains 7, each of a length to extend around an idler sprocket wheel 8 supported by a shaft 9 below the hopper. Each chain 7, of which there are four in the particular showing of the drawings, has links 10 at intervals, which links have their sides provided with matching ears 11 spaced apart by the width of the link and between each pair of ears is lodged a block 12 having one face dished, as shown at 13, so as to receive and carry a nut.

Supported by the shaft 5 is a casing 14 divided into an appropriate number of chutes 15. The casing 14 in its normal operative position slants downwardly from the shaft 5 toward the other end of the machine, and each chute 5 terminates in a pocket 16 through the bottom of which there is an opening 17 for the passage of a nut.

At an appropriate distance from the hopper the base 1 has uprights 18 supporting a table 19 provided with overhang marginal strips 20 serving as guides and holding members for a slide 21, which latter may be of plane or plate form with upright laterally disposed flanges 22, 23.

The flange 22 is at the end of the slide 21 toward the hopper while the flange 23 is spaced away from and located on the other side of the center of the slide from the flange 22. Near that end of the slide 22 remote from the flange there are erected lugs or bearings 24 for a shaft 25 projecting to one side of the slide 21 and there carrying a pinion 26 in mesh with a rack bar 27 carried by the upright 3 at an appropriate point.

Between the bearings 24 the shaft 25 carries a series of rollers 28. Pivotally connected to the shaft 25 are spaced links 29 joined at the ends remote from the shaft by a cross bar 30. Connected to the cross bar 30 either to rock thereon or fast thereto with the cross bar rocking in the links 29, is one end 31 of a pitman 32. This pitman is a two-part pitman suitably threaded and connected together by a threaded coupling 33 whereby on turning the coupling the two parts of the pitman may be made to approach, thus shortening the pitman, or to recede one from the other thus lengthening the pitman. The other end 34 of the pitman is carried by a wrist pin 35 on a crank disk 36 mounted on one end of a shaft 37 having an elongated journal bearing 38 carried by the upright 3.

At the end of the shaft 37 remote from the crank disk 36 are tight and loose pulleys 39, 40, respectively, and a balance wheel 41, while between the balance wheel 41 and the bearing 38 the shaft 37 carries a sprocket wheel 42.

Mounted on the shaft 5 is a sprocket wheel 43 and the sprocket wheels 42 and 43 are connected by a sprocket chain 44, whereby motion imparted to the shaft 37 by power applied to the pulley 40, as by a belt or otherwise, is transmitted to the shaft 5 by the sprocket chain 44.

No attempt has been made in the drawing to show any exactitude of proportion, but it will be understood that the sprocket wheels 42 and 43 are so arranged as to provide a proper sequence of movement as between the crank disk 36 and the nut elevating chains or carriers 7.

The upright 3 is extended throughout the length of the machine from the end carrying the shaft 25 to the upright 2 and certain parts of the structure may be supported by the upright 3. One of these parts is an arm 45 projecting laterally from the upright or web 3 adjacent to the upright 2 and constitutes a support for certain structures to be described. Fast to the arm 45 are a suitable number of rods 46 constituting the anvils of the cracking mechanism and these anvils project toward that end of the machine carrying the shaft 25, the anvils being substantially horizontal in the installed machine. Each anvil has what may be termed the rear end suitably recessed, as shown at 47, to receive and retain one end of a nut. Extending lengthwise through each anvil is an ejector rod 48 having one end in position to enter the recess 47 and eject a nut therefrom, while the other end of each rod extends beyond the corresponding end of the anvil and all the ejector rods are connected in common to a cross head 49. On each rod 48 between the cross head 49 and the corresponding end of the anvil 46 is a spring 50 tending to move the ejecting end of each ejector rod into the anvil. The force applied in the proper direction to the cross head will cause the simultaneous movement of all the ejector rods in a direction to compress the springs 50 and expel any nuts or portions thereof which may be at the time in the recesses 47.

In line with each anvil 46 is a follower head 51 shown best in Fig. 6. That end of the head 51 toward the anvil is provided with a recess 52 designed to receive the corresponding end of a nut lodged between the follower and anvil. The head 51 is axially bored, as indicated at 53, with the bore constricted as shown at 54 where opening into the recess 52, while the other end of the bore is normally closed by a plug 55. Within the bore 53 is an ejector pin 56 having near one end a head 57 preventing escape of the pin through the constricted end of the bore and determining the projection of the pin into the recess 52. A spring 58 within the bore 53 serves to yieldingly maintain the pin 56 with one end projected into the recess 52.

Each head 51 is tapered, as shown at 59, at the end remote from the recess 52 and there fits into a taper socket 60 in the corresponding end of a rod 61 constituting the body of the follower. Each rod 61 is slidable through a suitable passage in the flange 22 and also projects through a corresponding alined passage in the flange 23, and beyond said flange has a bifurcated termination in the form of matching ears 62.

A spring 63 is fast at one end to the rod 61 and at the other end to an appropriate part of the slide 21.

Carried by the arm 45 is a block 64 provided with a seat for a sliding head 65 on one end of a rod 66 which latter is extended toward the rear of the machine through the flange 22, and is there held by a set screw 67. The block 64 has an angle arm continuation 68 on which is mounted a rock lever 69 by means of a rock spindle 70, which latter in turn carries a pawl 71. The head 65 carries another pawl 72 controlled by a spring 73, so that on an appropriate movement of the head 65 the pawl 72 will snap behind the pawl 71, but on a return movement of the head 65 the pawl 72 engages the pawl 71 and causes a rocking movement of the lever 69 in a direction to engage the cross head 49 and actuate the ejector rods 48 against the tendency of the springs 50, which latter ultimately return the cross head 49 and lever 69 to the normal positions. The movements of the head 65 are caused by movements of the slide 21, as will hereinafter appear.

Underriding the discharge ends of the chutes 15 is another slide 74 having a passage 75 therethrough for each passage 17. The slide 74 is capable of reciprocating so that in one position the passages 75 and 17 match and in another position the passage 75 is moved out of coincidence with the passage 17 and the latter is closed by an unbroken portion of the slide 74. Carrying the slide 74 is a member 76 provided with elongated channels 77 of a length and so disposed as to bridge the normal space between the respective anvil 46 and follower head 51. The slidable member 76 is of less length than the slide 74, so that it may be moved out of bridging relation to the anvil and follower head and a nut carried between the anvil and follower head may then fall away therefrom as the follower head is moved away from the anvil. Whenever the passage 75 is brought into coincidence with the corresponding passage 17 a corresponding channel 77 of the slidable member 76 is always in position to receive a nut gravitating from the corresponding chute 15.

The slidable member 76, together with the slide 74, is actuated by a rock arm 78 suitably pivoted to the frame of the machine and in turn actuated by a link 79 connected to a lug 80 on the slide 21.

To prevent any liability of rocking movements of the followers 61 which are rounded where passing through the flanges 22 and 23, each follower is formed with a longitudinal slot 81 traversed by a guide head 82 on the end of a respective rod 83 fast to the arm 45.

Between the ears 62 of each follower 61 there is pivoted at one end a segmental block 84 engaged by a respective one of the rollers 28. Each block at a point about midway of its length is pivoted to and lodged in a bifurcated head 86 on one end of a rod 87 slidable through a cross bar 88 with a spring 89 surrounding the rod 87 between the head 86 and the cross bar 88. Each rod 87 is long enough to project above a cross bar 88 and is there threaded for the application of a thumb nut 90 by means of which the altitude of the segmental block 84 is determined. The cross bar 88 is mounted on an intermediate post 91 erected on the slide 21.

When power is applied to the drive shaft 37 the elevator or feed chains 7 are set into motion so as to periodically raise the nuts in the hopper 4 to the top of the elevating structures, then discharge them into the chutes 15 along which they gravitate to the pockets 16 and fall through the openings 17. The operation of the parts is so timed that when the openings 17 and 75 coincide the respective anvil and follower are separated and the channel 77 receiving the nut is so arranged as to aline the longer axis of the nut with the anvil and follower. As soon as this occurs the follower is moved by the crank disk 36 and pitman 32 through the parts connected thereto so as to approach the anvil, thereby gripping the nut at the ends, the member 76 in the meantime moving from under the nut and the solid portion with the slide 74 moving into closing relation to the opening 17. This movement continues until the nut is gripped and the pressure upon the follower 61 then forces the block 84 into engagement with the corresponding roller 28, so that the block 84 which is of segmental shape is moved from a point below the horizontal diameter of the roller 28 into alinement with a diameter of the roller 28, this movement resulting in a corresponding movement of the follower toward the nut, the spring 89 yielding sufficiently for the purpose. The added movement thus imparted to the follower is sufficient to bring about the shattering of the shell of the nut, whereupon the nut falls from between the anvil and follower when the parts are released from pressure. The spring 63 now moves the block 84 out of active engagement with the respective roller 28 and the spring 89 thereupon returns the block 28 to its primary low position.

Rotative movement of the shaft 25 carrying a series of rollers 28 is brought about by the engagement of the pinion 26 with the rack 27.

The ejection of portions of the nuts from the recesses 52 is caused by the reaction of the spring 58 compressed by the whole nut while the ejection of the corresponding ends of the nuts from the recesses 47 is brought about by the positive movement of the ejector rods by the actuation of the cross head 49 in the manner already described.

The sleeve 33 having right and left hand threaded connections with the two sections of the pitman 32 permits adjustments of the effective length of the pitman to determine the movements of the followers to most effectively crack the nuts.

It will be understood that the machine may be made by additions to or substractions from the parts shown to provide less than four cracking devices, or more than four cracking devices.

The followers are moved to the nut gripping positions, while the final cracking movements are brought about by a toggle structure set into motion by the frictional engagement of two meeting members movable about oppositely disposed centers in normally less separation than the combined radial lengths of the members from their points of movement or rotation.

What is claimed is:—

1. In a nut cracking machine, an anvil, a nut engaging follower movable toward and from the anvil, actuating means for the follower in toggle relation during the nut cracking operation, and elastically yieldable means connected to the plunger and tending at all times to move the actuating means out of toggle relation.

2. In a nut cracking machine, a nut engaging anvil, a follower in operative relation thereto and movable toward and from the anvil, and elastically yieldable in a direction away from the anvil, a segmental friction member carried by the follower, and a rotatable member in operative relation to the segmental member, the parts being timed in action and related in position to cause a nut lodged between the anvil and follower to force the segmental and rotative members into frictional engagement.

3. In a nut cracking machine, nut-engaging anvils, a slide movable toward and from the anvils, a plurality of followers in number corresponding to the anvils and in operative relation thereto, said followers being movable with the slide toward and from the anvils and also movable in the slide with respect thereto, springs connected to the slide and followers and having a normal tendency to move the followers in the slide toward the respective anvils, said springs being yieldable in a direction away from the anvils, a segmental friction member carried by each follower, and rotatable members on the slide, one for each friction member, the parts being timed in action and related in position to cause nuts lodged between the anvils and followers to force the segmental and rotatable members into frictional engagement against the action of the springs.

4. In a nut cracking machine, nut engaging members in alinement and having a relative movement toward and from each other, one of the members being elastically yieldable in a direction away from the other, a segmental member carried by the elastically yieldable member, and a rotatable member for actuating the segmental member, the nut crancking member carrying the segmental member having an extent of yieldable movement under the resistance of a nut lodged between the nut cracking members to force the segmental member into operative frictional engagement with the rotatable member, and the segmental member being provided with elastically yieldable means imparting to it a normal constraint in opposition to the movement imparted to the segmental member by frictional engagement with the rotatable member.

5. In a nut cracking machine, an anvil, a follower alined therewith and normally spaced therefrom, means for moving the follower toward the anvil, a segmental block carried by the follower at the end remote from the anvil, a rotatable member in line with the segmental block, and a spring engaging the segmental block and constraining it toward angular relation to the rotatable member.

6. A nut cracking machine comprising a plurality of associated anvils, a corresponding plurality of followers alined with the anvils and normally spaced therefrom, a slide carrying the followers, means for moving the slide and followers bodily toward the anvils, elastic means between the followers and slide for permitting movements of the followers irrespective of the slide, a segmental block carried by each follower at the end remote from the anvil, a rotatable member in line with each segmental block, a spring engaging each segmental block and constraining it to angular relation to the respective rotatable member, a common carrier for the springs mounted on the slide, and means for causing rotation of the rotatable members by movements of the slide.

7. In a nut cracking machine, a plurality of associated anvils, a corresponding plurality of followers alined with the anvils and movable toward and from the latter, a segmental block carried by and pivoted to each follower at the end remote from the respective anvil, a rotatable member in line with each segmental block and adapted to engage the block and move it about its pivotal connection with the follower, a spring engaging each segmental block and constraining it to angular relation to the respective rotatable member, a common carrier for the springs, and means for causing rotation of the rotatable members.

8. In a nut cracking machine, a nut engaging anvil, a slide movable toward and from the anvil, a nut engaging follower mounted on the slide and having longitudinal movement independent of the slide, a spring between the follower and slide for normally constraining the follower to move on the slide toward the nut-engaging position, a rotatable member on the slide, a rock member on the slide directed toward the rotatable member and connected to the follower at the end of the rock member remote from the rotatable member and related to said rotatable member to be moved toward a position of alinement with the follower by frictional engagement with said rotatable member, and means having a constant tendency to move the rock member about its axis of rocking in a direction away from a position of alinement with the follower.

9. In a nut cracking machine, a nut engaging anvil, a slide movable toward and from the anvil, a nut engaging follower mounted on the slide and having longitudinal movement independent of the slide, a spring between the follower and slide for normally constraining the anvil to nut-engaging position, a rotatable member on the slide, a rock member on the slide directed toward the rotatable member and connected to the follower at the end of the rock member remote from the rotatable member and related to the rotatable member to frictionally engage the latter by the resistance of a nut interposed between the anvil and follower with the resistance exerted in opposition to the spring, said rockable member being provided with a spring tending to oppose movements of the rockable member by the frictional engagement therewith of the rotatable member.

10. In a nut cracking machine, a nut-engaging follower provided at one end with a taper socket and at the same end provided with a head having one end tapered and lodged in the taper socket in the body of the follower and the other end provided with a nut-receiving socket, and an ejector pin mounted in the head and elastically yieldable to the pressure of a nut lodged in said head.

11. In a nut cracking machine, a nut engaging follower having a body member with a socket in one end, and a nut engaging head having a recess in the end remote from the follower body and with the other end adapted to lodge in the socket, said head being provided with a longitudinal bore having an ejector pin therein, and a spring for projecting the pin and yieldable to the pressure exerted upon the pin by a nut lodged in the recess.

In testimony that I claim the foregoing as my own, I have hereto affixed my signature in the presence of two witnesses.

JOHN DOMINICK CANALE.

Witnesses:
F. M. YALE,
E. W. GENTRY.